Dec. 6, 1966 — T. M. McSWAIN — 3,289,787
COLLAPSIBLE HUNTING SHELTER
Filed July 10, 1964 — 3 Sheets-Sheet 1
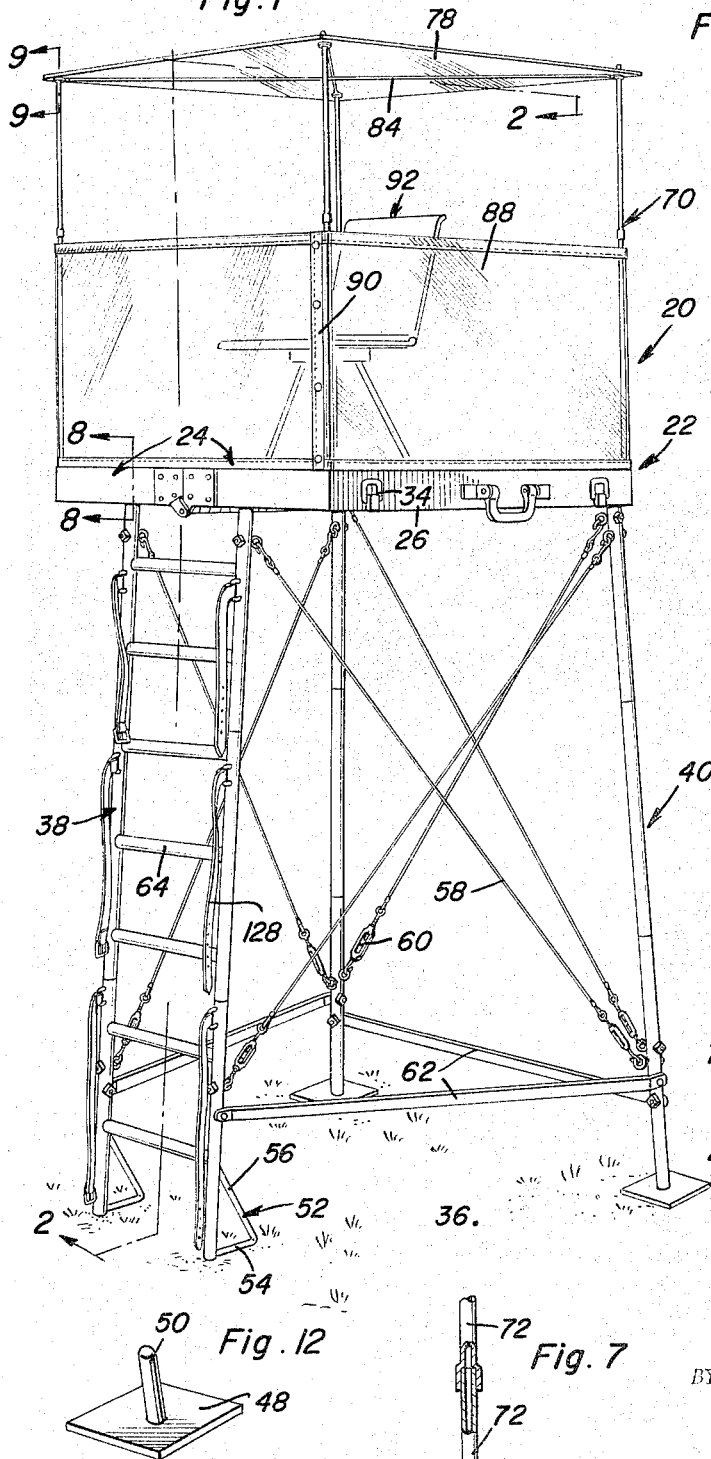
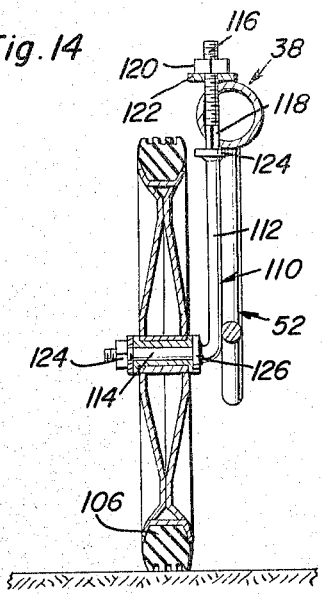
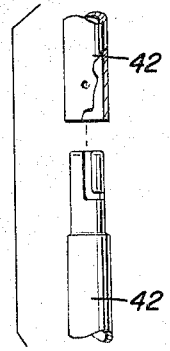
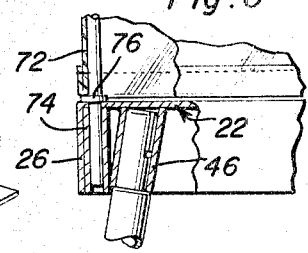
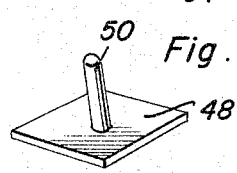
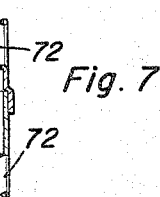
Thad M. McSwain
INVENTOR

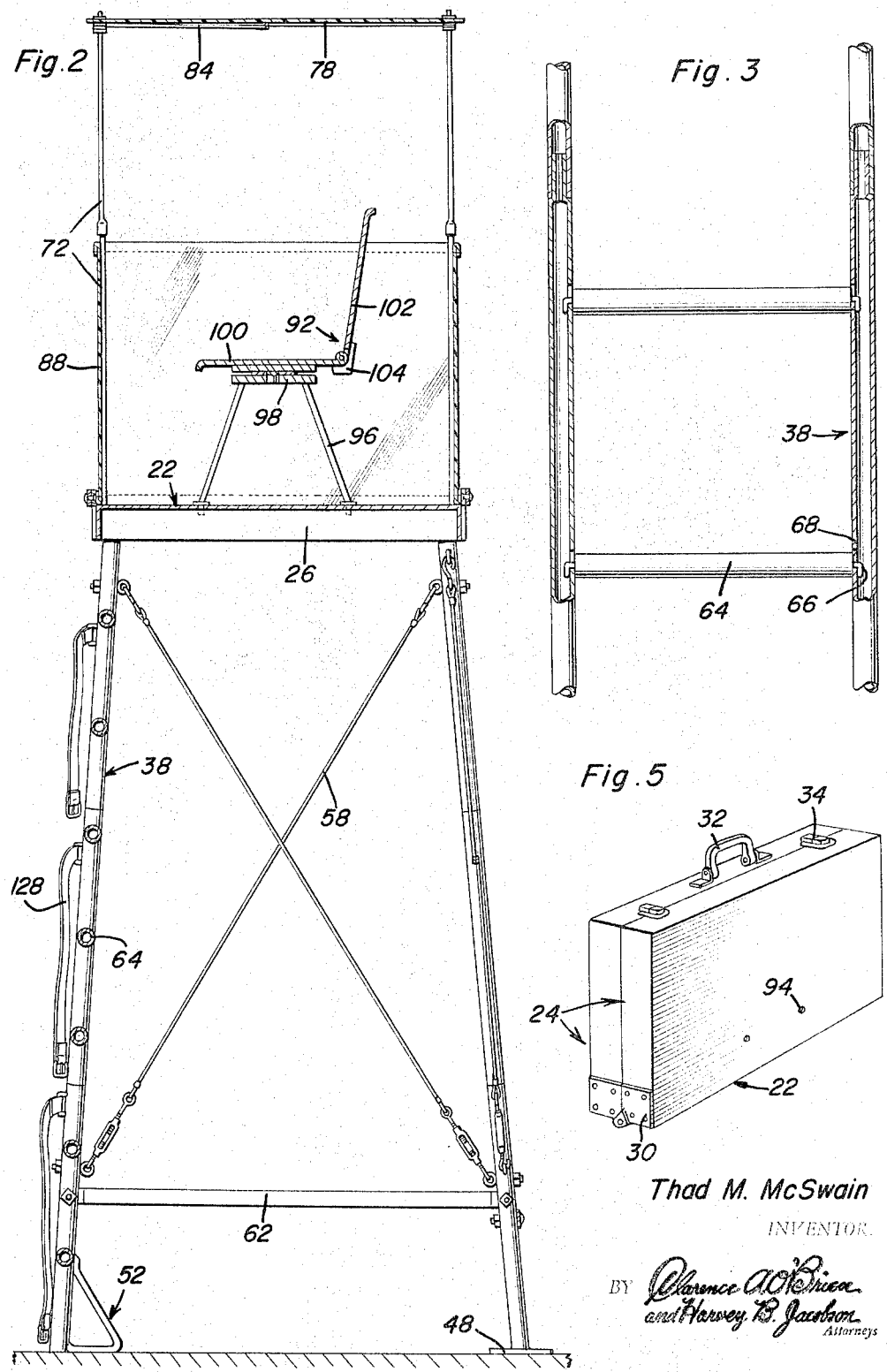

Dec. 6, 1966 T. M. McSWAIN 3,289,787
COLLAPSIBLE HUNTING SHELTER
Filed July 10, 1964 3 Sheets-Sheet 3

Thad M. McSwain
INVENTOR.

BY Clarence A. O'Brien
and Harvey B. Jacobson
Attorneys

United States Patent Office 3,289,787
Patented Dec. 6, 1966

3,289,787
COLLAPSIBLE HUNTING SHELTER
Thad M. McSwain, 1912 S. Main St., Stuttgart, Ark.
Filed July 10, 1964, Ser. No. 381,747
11 Claims. (Cl. 182—20)

The instant invention is generally concerned with portable shelters, and it is more particularly directed to a collapsible elevated shelter, which will find particular use as a combination hunting platform and shelter.

It is a primary object of the instant invention to provide a hunting shelter which, in addition to providing a sheltered, upraised vantage point, is also of a nature so as to be easily compacted and carried from one location to another, this being particularly desirable where the hunting site can only be reached on foot.

In conjunction with the above object, it is a significant object to provide a collapsible shelter wherein all of the individual pieces thereof are receivable within a folding box or suitcase-like container, this container itself forming the supporting platform of the erected shelter.

Further, it is an object of the instant invention to provide a collapsible shelter which, although extremely rigid in its erected form, is lightweight, thus making it easily transported from one location to another.

Likewise, it is a significant object of the instant invention to provide a collapsible shelter which utilizes a ladder structure as part of the support therefor.

In conjunction with the above object, it is also an object of the instant invention to provide for the use of the ladder-like structure, in conjunction with a pair of wheels, as a carrier or hand truck.

In order to achieve these objects, the invention includes a rectangular box formed of two independent sections hinged together and capable of being opened so as to form a flat platform. The platform is maintained in an elevated position by a plurality of vertically elongated support legs, two of the legs having a vertical series of horizontal ladder rungs fixed therebetween so as to provide access means to the platform, while the remaining legs are interconnected to each other and to the two first mentioned legs by various bracings. These legs, which include removable braces and enlarged feet, are of course collapsible so as to be received within the carrying case defined by the two sections of the platform. Finally, the platform is provided with a plurality of upstanding posts thereon, these posts supporting both a top cover and a side wall so as to form a sheltered enclosure within which is removably mounted a rotatable support or chair, all of these elements also being collapsible and of a size so as to be received, when collapsed, within the carrying case. In addition, the two support legs interconnected by the ladder rungs are, in conjunction with the rungs, removable from the remainder of the structure as a single unit and, through a pair of wheels removably mounted on one end thereof, useable as a carrier or hand truck, securing straps being provided therealong.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the erected structure comprising the instant invention;

FIGURE 2 is an enlarged cross-sectional view taken substantially through a plane indicated by section line 2—2 in FIGURE 1;

FIGURE 3 is a partial elevational view, with portions broken away for purposes of illustration of the two front support legs which, in conjunction with the transversely extending removable ladder rungs, form the access means to the platform;

FIGURE 5 is a perspective view of the platform sections closed so as to form a carrying case for the remaining elements of the shelter packed therein generally as illustrated in FIGURE 4;

FIGURE 6 is a partial sectional view through a rear corner of the shelter illustrating both the manner in which a cover supporting post is to be engaged therewith, and the manner in which a supporting leg is to be engaged therewith;

FIGURE 7 is a partial sectional view illustrating one form of joint between the sections of a post;

FIGURE 10 is an exploded view illustrating one form of interlock between the sections of a support leg;

FIGURE 12 is a perspective view of the removable brace associated with each of the rear support legs;

FIGURE 14 is an enlarged cross-sectional view taken substantially on a plane passing along line 14—14 in FIGURE 13.

Figure 4:
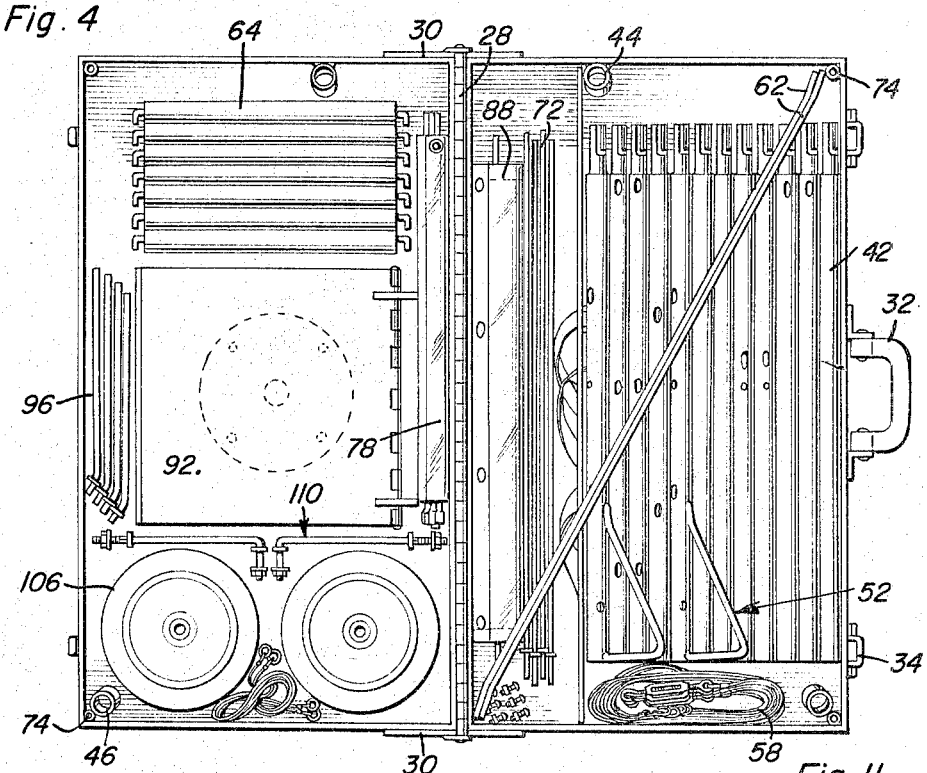
FIGURE 4 is a view of the various elements, which go up to make the hunting shelter, collapsed and stored within the two platform sections.

Referring now more specifically to the drawings, reference numeral 20 is used to generally indicate the entire shelter comprising the instant invention. The shelter 20 includes an enlarged rectangular platform 22, formed from two substantially equal size sections 24. Each of these sections 24 includes a peripheral depending wall 26 thereabout so as to form, in effect, a pair of box-like sections which, when positioned in facing relation to each other, form a carrying case or suitcase for containing the various other elements which go into making up the shelter, as shall be described presently. The two sections 24 are hingedly connected along the adjoining edges by an elongated piano type hinge 28, and a pair of knife hinges 30, one at each end thereof. It will be appreciated that the sections 24 are so hinged as to enable movement of the sections 24 from a first closed position, as illustrated in FIGURE 5, to a second position, as best seen in FIGURE 1, wherein the adjoining hinged edges of the section 24 are in abutment with each other so as to maintain the sections coplanar for forming a flat supporting platform for the shelter. FIGURE 5 also shows a carrying handle 32 and a pair of catches 34 for interlocking and carrying the sections.

Figure 11:
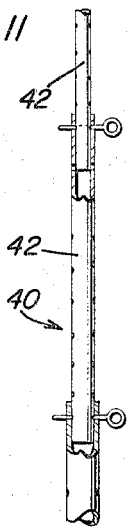
FIGURE 11 is a partial elevational view illustrating another manner of interconnecting leg sections.

The platform 22 is supported in an elevated position relative to the ground 36 by front and rear pairs of support legs 38 and 40. Each of the support legs is composed of a plurality of interconnected, elongated, hollow tubular sections 42 which are each of a length so as to allow them to be conveniently received within the folding sections 24 of the platform 22, as illustrated in FIGURE 4. With reference to FIGURES 10 and 11, it will be noted that these sections 42 can be releasably or collapsibly connected in a variety of ways. For example, as shown in FIGURE 10, the upper end of each section 42 can be diametrically reduced and provided with a bayonet slot therein for locking reception within the lower end of a superimposed section 42 having an outwardly projecting lug. FIGURE 11 shows a plurality of sections 42, each superjacent section being telescopically receivable within a subjacent section, with the sections having a plurality of vertically spaced aligned apertures therein for the reception of locking pins therethrough in any of a plurality of vertically adjusted positions.

Figure 8:
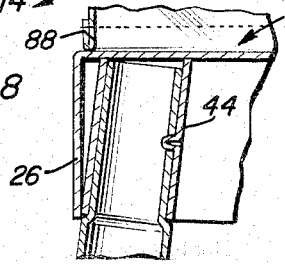
FIGURE 8 is a partial cross-sectional view taken substantially on a plane passing along line 8—8 in FIGURE 1.

The front legs 38 are inclined downwardly and forwardly in parallel relation to each other from points spaced equally outward from the adjacent abutted edges of the two platform sections 24. These legs 38, as will be appreciated from the drawings, being orientated at an intermediate point between the abutting edges and the side edges of the sections 24. The upper ends of the legs 38 are received within downwardly opening, forwardly inclined, tubular sockets 44 fixed to the under portions of the platform 24, and, if so desired, to the depending peripheral walls 26. These sockets 44 will of course not depend below the lower edge of the peripheral walls 26, and as such, will not interfere with the closing of the sections relative to each other so as to form the case of FIGURE 5. The upper ends of the collapsible support legs 38 are secured within the sockets 44 in a releasable manner, such as through the use of a bayonet slot and lug arrangement as suggested in FIGURE 8.

The rear legs 40 extend dorwnwardly, rearwardly and laterally outward from the platform 22, and, in effect, diverge outwardly from each other as well as from the front legs 38. The rear legs 40 are releasably secured to the platform 22 in the same manner aas the front legs 38, that is, through depending, downwardly inclined, sockets 46 within which the upper ends of the legs 40 are releasably secured, these sockets 46 being inclined along the line to be assumed by the legs 40.

In order to stabilize the structure 20, and provide a firm base therefor, the rear legs 40 are provided with enlarged flat, rectangular feet 48, which include centrally located, upwardly projecting, stubs 50 thereon, these stubs 50 in turn being telescopically received within the lower ends of the lower hollow sections 42 which go to make up the collapsible legs 40. By the same token, the front legs 38 are provided with angular braces 52 bolted thereto, these braces including a horizontal arm 54 projecting rearwardly from the corresponding front leg 38, and a diagonally extending arm 56 extending from the rear end of the arm 54 to a point above the lower end of the leg 38. In addition, a plurality of diagonally extending tensionable cables 58 are provided both between the front and rear legs 38 and 40 and between the rear legs 40 themselves, suitable turn buckles 60 being provided so as to effect the desired tensioning, along with horizontally extending rigid bracing rods 62 having the outer ends thereof releasably bolted to the corresponding legs. Finally, the front legs 38 are braced relative to each other by a plurality of vertically spaced, horizontally extending, rigid ladder rungs 64. These rungs 64 are to be releasably engaged with the legs 38 at the opposite ends thereof by, for example, integral hooks 66 thereon which are received through apertures 68 in the legs 38 in a manner so as to be disengageable only by a raising of the rung 64. These rungs 64, as will be readily appreciated from the drawings, in addition to interlocking the front legs 38, also function so as to form an access ladder to the platform 22.

In order to provide a shelter on or in conjunction with the platform 22, four vertical posts 70 are provided, one projecting upwardly from each corner of the platform 22. These posts 70, as were the legs 38 and 40, are made up of a plurality of sections 72 which are releasably interlocked so as to be collapsed down to a size which can be conveniently positioned within the case sections. One manner of interlocking the section or units 72 is illustrated in FIGURE 7, and consists of providing the lower end of the superimposed section 72 with an enlarged or belled portion so as to telescopically receive the upper end of the lower section. The lower ends of the posts 70 are telescopically received through openings in the platform 22 in depending sleeves or sockets 74 fixed to the platform 22 and depending therefrom, these sockets 74 also being fixed to the adjacent wall 26, if so desired. The lower section 72 of each post 70, referring specifically to FIGURE 6, is provided with a stop collar 76 located above the lower end thereof so as to provide a limit to the reception of this section in the socket or sleeve 74. Incidentally, it will be noted that the rear leg sockets 46, also being located at the corners of the platform 22, are located just inwardly of the post sockets 74, although it will of course be appreciated that the exact orientation of the sockets 46 and 74 to each other can be varied slightly as long as the general location thereof is maintained.

Figure 9:
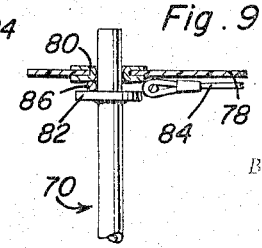
FIGURE 9 is a partial cross-sectional view taken substantially on a plane passing along line 9—9 in FIGURE 1, illustrating the manner in which one corner of the top cover, along with a bracing cable therebeneath is engaged with the post.

A cover 78 is supported on the upper ends of the posts 70, this cover 78 having, referring to FIGURE 9, a grommeted opening 80 corresponding to the location of each of the posts 70 for the reception of the upper end of the posts 70 therethrough, the posts 70 also including a collar 82 below the upper end thereof so as to form a rest for the cover 78. In order to interlock the upper ends of the posts 70 and provide a support for the central portion of the cover 78, which incidentally will be of a flexible foldable material, diagonal braces 84 are provided, these braces 84 having the opposite ends thereof releasably engaged, for example through rings 86, with the posts 70 below the cover 78. If so desired, suitable clip or clamp means can also be provided for engagement with the projecting upper ends of the posts so as to prevent accidental removal of the cover 78.

The final enclosing of the platform 22 is achieved through a flexible wall 88 which is engaged about the lower approximately one-half of the posts 70. This flexible wall 88 is to have one end thereof either permanently or releasably secured to one of the posts 70, and the other end thereof releasably buttoned or snapped to the first end, this being generally indicated by reference numeral 90. This engagement of the ends of the wall 88 to each other is to be at the front of the platform, thus allowing an opening of the wall above the access ladder formed by the rung-interlocked front legs 38.

The instant invention also contemplates the provision of a swivel seat 92 mounted centrally on the platform 22, this seat 92 being collapsible for reception within the case. Accordingly, four sockets or holes 94 are provided in the platform, two in each section. Four legs 96 having angled lower ends and stop collars thereon, are provided with the angled lower ends being received within the platform openings 94 in a manner so as to enable the legs to project in upwardly converging relationship to each other. The chair 92 is releasably fixed on the upper ends of the legs 96 through a swivel mount 98 which has holes or sockets therein for the reception of the upper ends of the legs 96. This swivel mount 98 directly supports the seat portion 100 of the chair 92 which in turn hingedly supports the back portion 102, a suitable stop 104 being provided so as to properly maintain the back 102 in its open or upright position. The hinged connection between the seat 100 and back 102 of course allows the chair 92 to be collapsed for reception within the case, while the pivot mount allows the chair to be swung about in a complete circle, while still rigidly fixed to the central portion of the platform 22.

Figure 13:
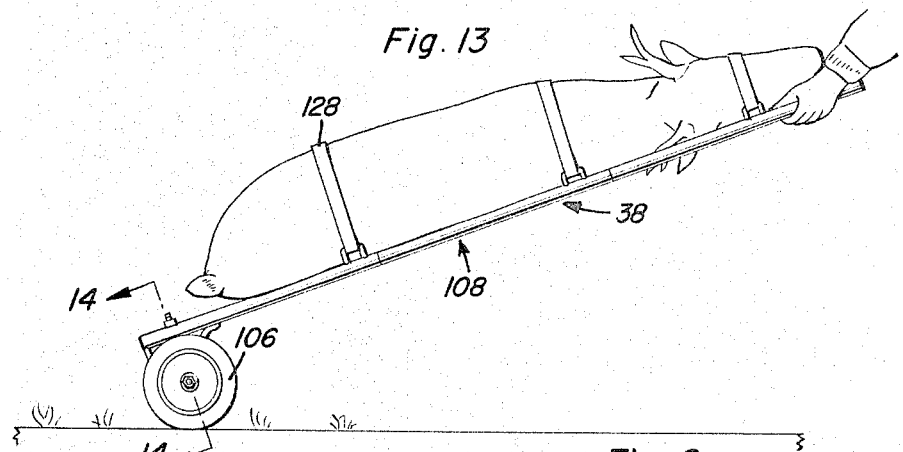
FIGURE 13 illustrates the use of the rung connected support legs, in conjunction with a pair of wheels, as a carrier or hand trunk.

Referring now particularly to FIGURES 13 and 14, it will be appreciated that the two front legs 38, interconnected by the rungs 64, are uniquely adaptable for use as an independent unit, in conjunction with a pair of wheels 106, as a carrying device or hand trunk 108. In order to adapt these legs 38 to use in this manner, a pair of mounting brackets 110 are provided, these brackets each including an elongated shank 112 and a right angularly projecting wheel axle 114 integral with one end thereof. The shank 112 has the free end thereof externally threaded, as at 116, this end being received transversely through a pair of aligned apertures adjacent the lower end of the corresponding leg 38 with the axle portion 114 extending laterally outward from the leg 38 so as to orientate the wheel 106 to the outer side of this leg 38. The shank end 116 is locked to the leg in a manner so as to preclude rotation, such as for example by a squaring of a portion 118 of the shank which is received within one of the leg openings. The actual locking of the shank to the leg 38 is accomplished by a lock nut 120 and a washer 122 threaded on the outer end 116 and clamping the leg 38 against a stop collar 124 fixed to the shank itself. The wheel 106 is secured to the axle shaft 114 in a similar manner by being clamped between a threaded lock nut 124 and a stop collar 126 welded to the axle portion 114 adjacent to the inner end thereof. As will be appreciated from FIGURE 14, the length of the bracket 110 is sufficient so as to orientate the wheel 106 outwardly and rearwardly beyond the stabilizing brace 52, thereby avoiding any interference from this brace 52 when utilizing the device as a carrier as shown in FIGURE 13. Finally, in order to secure a load on the carrier 108, several securing straps 128 are provided at spaced points along the carrier 108. These straps 128, as will be appreciated from FIGURE 1, are in the form of belt sections, each section having one end thereof secured to one of the legs 38 for releasable interlocking connection with a corresponding strap section on the other leg 38. These straps 128 will of course be adjustable.

While a particular arrangement of the various collapsed elements has been illustrated in FIGURE 4, it will be appreciated that this arrangement can be varied, and further, suitable tie straps or mounting brackets can be provided within the case or platform sections so as to allow one section to be closed over the other section while retaining the arrangement of the elements.

From the foregoing, it will be appreciated that a highly novel collapsible shelter has been defined, this shelter, in its erected form, being of a highly stable nature and providing a protected elevated vantage point incorporating a centrally located seat removably mounted therein. Also, it was pointed out that a portion of the shelter, the rung-interconnected two front legs, is additionally usable, in itself, as a carrier or hand trunk for various objects. In fact, this carrier can, if so desired, even be utilized to carry the case consisting of the folded platform sections loaded with the remaining elements. However, inasmuch as the various elements are to be made of lightweight tubular material, it is not contemplated that any difficulty will be encountered in carrying the entire collapsed unit by the handle provided thereon in the manner of a conventional suitcase. Incidentally, while the carrier has been described as provided with wheels, if necessary, due to extremely soft soil conditions, the wheels can be removed, thus allowing the front leg braces to act in the manner of skids or runners.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A collapsible elevated hunting shelter comprising a support platform, four support legs fixed to the platform and depending therefrom for engagement with the ground so as to support the platform thereabove, a plurality of vertically spaced horizontal ladder rungs extending between and fixed to a pair of adjoining support legs, thereby forming a means of access to the platform, and brace means engaged between said pair of legs and the remaining legs, said platform being rectangular in shape, said pair of legs being fixed to said platform along one edge thereof with the legs of said pair being spaced an equal distance outwardly on opposite sides of the center of said one edge, said legs of the pair of legs being spaced inwardly of the ends of said one edge, the other two legs being fixed to said platform adjacent the ends of the edge opposite said one edge, said platform being formed of two adjacent rectangular sections, each section having a depending peripheral wall thereabout, and hinge means connecting the adjacent sides of said sections so as to enable the sections to pivot into superimposed relation to each other with the edges of the peripheral walls abutting each other so as to form an enclosed space.

2. The structure of claim 1 including tubular sockets fixed to the platform and depending therefrom, the upper end of each support leg being fixed in one of said sockets, said sockets having the lower end thereof located on line with or slightly above the lower edge of the peripheral walls.

3. The structure of claim 1 including upwardly opening sockets at each corner of the platform, a vertical post received in each socket and projecting upwardly therefrom, and a cover fixed to the upper ends of said posts in spaced relation above said platform.

4. The structure of claim 3 wherein said pair of legs, and the rungs extending therebetween, are removable as an entity from the remainder of the structure, wheel means, and means for mounting said wheel means on the lower ends of said pair of legs so as to project laterally therefrom.

5. The structure of claim 3 including a laterally projecting member fixed to and projecting laterally from the lower end of each of said pair of legs.

6. The structure of claim 5 wherein said laterally projecting member is in the form of a ground engaging brace.

7. The structure of claim 6 wherein each of the units thereof, aside from the platform, are capable of being collapsed sufficiently for reception within the walls of said sections.

8. The structure of claim 7 including tubular sockets fixed to the platform and depending therefrom, the upper end of each support leg being fixed in one of said sockets, said sockets having the lower end thereof located on line with or slightly above the lower edge of the peripheral walls.

9. The structure of claim 8 including upwardly opening sockets at each corner of the platform, a vertical post received in each socket and projecting upwardly therefrom, and a cover fixed to the upper ends of said posts in spaced relation above said platform.

10. The structure of claim 8 including a plurality of upwardly opening sockets centrally located on said platform, seat legs received in said centrally located sockets and projecting thereabove, and a seat mounted on the upper ends of the seat legs.

11. The structure of claim 5 including flat enlarged feet releasably engaged wtih the lower ends of the legs other than said pair of legs.

References Cited by the Examiner
UNITED STATES PATENTS 2,936,204  5/1960  Sofi _____ 108—34

REINALDO P. MACHADO, *Primary Examiner.*